United States Patent
Thalmann et al.

(10) Patent No.: US 11,821,395 B2
(45) Date of Patent: *Nov. 21, 2023

(54) EXCHANGEABLE FILTER OF A TREATMENT DEVICE FOR TREATMENT OF, IN PARTICULAR, LIQUID FLUIDS AND A TREATMENT DEVICE

(71) Applicant: MANN+HUMMEL GmbH, Ludwigsburg (DE)

(72) Inventors: Christian Thalmann, Speyer (DE); Ludwig Bammersperger, Reisbach (DE); Martin Traublinger, Neufahrn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 351 days.

This patent is subject to a terminal disclaimer.

(21) Appl. No.: 17/159,677

(22) Filed: Jan. 27, 2021

(65) Prior Publication Data

US 2021/0215125 A1   Jul. 15, 2021

Related U.S. Application Data

(63) Continuation of application No. 15/479,730, filed on Apr. 5, 2017, now Pat. No. 10,907,594.

(30) Foreign Application Priority Data

Apr. 6, 2016   (DE) .................. 10 2016 003 942.6

(51) Int. Cl.
*F02M 37/42*   (2019.01)
*B01D 27/08*   (2006.01)
(Continued)

(52) U.S. Cl.
CPC ............. *F02M 37/42* (2019.01); *B01D 27/08* (2013.01); *B01D 27/103* (2013.01); *B01D 29/05* (2013.01);
(Continued)

(58) Field of Classification Search
CPC .... F02M 37/42; F02M 25/0224; F02M 37/22; B01D 27/08; B01D 27/103; B01D 29/15;
(Continued)

(56) References Cited

U.S. PATENT DOCUMENTS

| | | | | |
|---|---|---|---|---|
| 4,764,275 A | * | 8/1988 | Robichaud | B01D 27/005 55/504 |
| 7,267,768 B2 | * | 9/2007 | Kolczyk | B01D 35/153 210/DIG. 17 |
| 10,907,594 B2 | * | 2/2021 | Thalmann | F02M 37/42 |

* cited by examiner

*Primary Examiner* — Madeline Gonzalez

(57) ABSTRACT

An exchangeable filter of a treatment device has a housing with a housing pot and a housing cover connected to the open side of the housing pot. The exchangeable filter is connectable to a connecting head of the treatment device with a bayonet-type connecting device. The connecting device has a housing connecting part on the housing interacting with a head connecting part of the connecting head for connecting the connecting device. The housing has an inlet for a fluid to be treated connectable to a supply conduit of the treatment head and an outlet for the treated fluid connectable to a discharge conduit of the treatment head. The housing pot has a rim at the open side of the housing pot. The rim radially outwardly surrounds the housing connecting part and axially projects past the housing connecting part in a direction away from the housing bottom.

15 Claims, 4 Drawing Sheets

(51) Int. Cl.
*B01D 27/10* (2006.01)
*B01D 29/15* (2006.01)
*B01D 35/30* (2006.01)
*F01M 1/10* (2006.01)
*F01P 11/12* (2006.01)
*F02M 25/022* (2006.01)
*B01D 29/05* (2006.01)

(52) U.S. Cl.
CPC ............... *B01D 35/30* (2013.01); *F01M 1/10* (2013.01); *F01P 11/12* (2013.01); *F02M 25/0224* (2013.01); *B01D 2201/302* (2013.01); *B01D 2201/347* (2013.01); *B01D 2201/4015* (2013.01); *B01D 2201/4046* (2013.01); *B01D 2201/4076* (2013.01); *F01M 2001/1035* (2013.01); *Y02T 10/12* (2013.01)

(58) Field of Classification Search
CPC .............. B01D 35/30; B01D 2201/302; B01D 2201/347; B01D 2201/4015; B01D 2201/4046; B01D 2201/4076; B01D 17/02; F01M 1/10; F01M 2001/1035; F01P 11/12; Y02T 10/12
USPC .................. 210/232, 236, 282, 440–444, 455
See application file for complete search history.

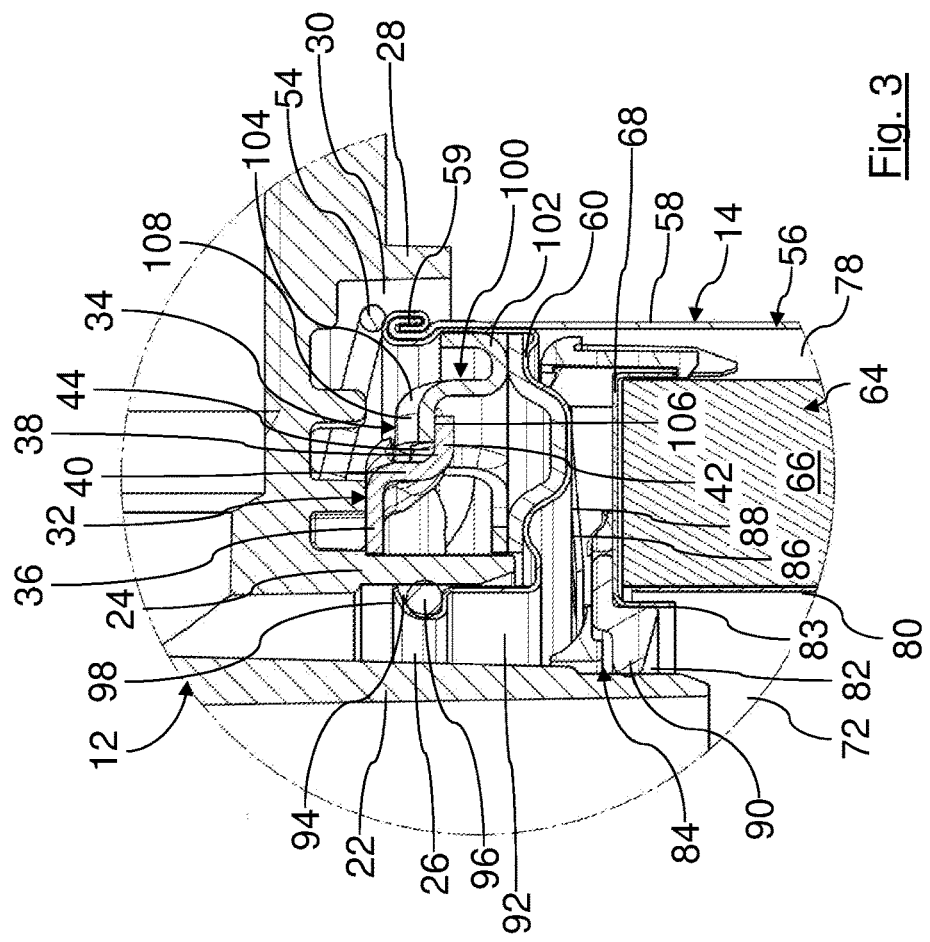
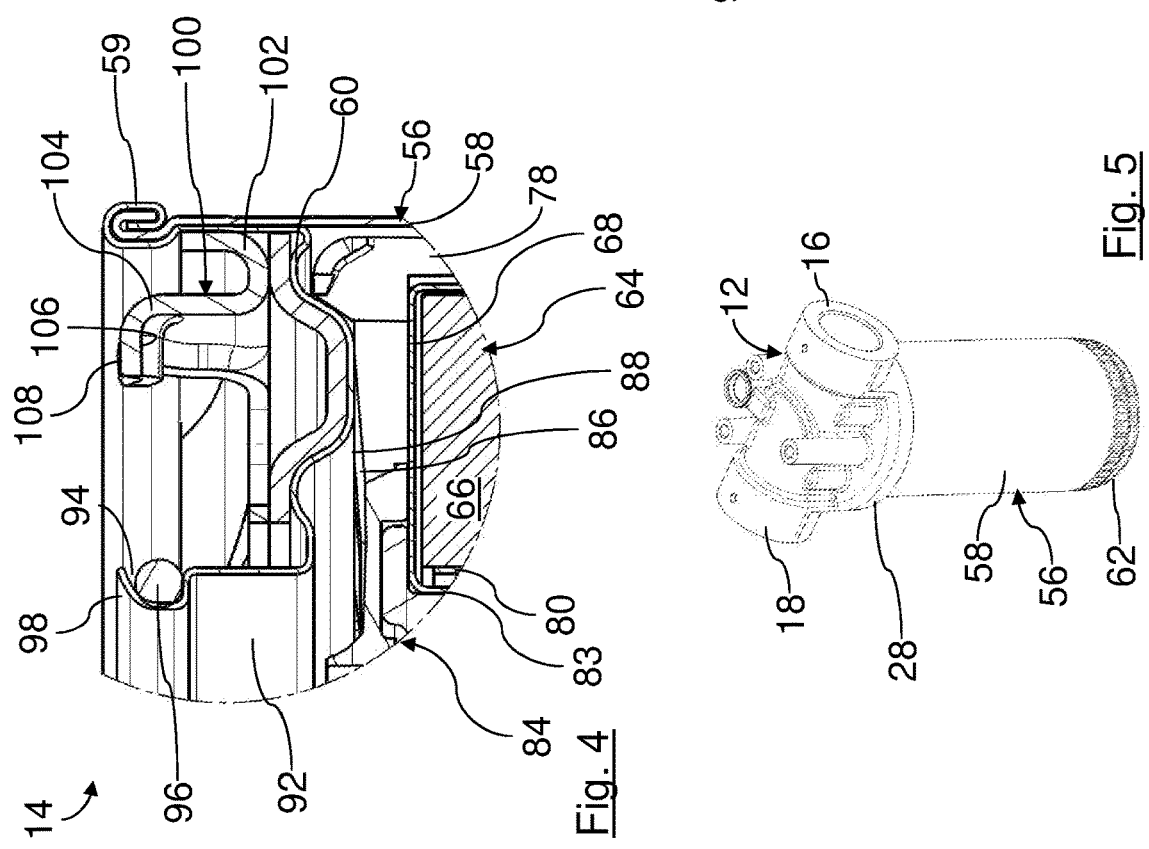

EXCHANGEABLE FILTER OF A TREATMENT DEVICE FOR TREATMENT OF, IN PARTICULAR, LIQUID FLUIDS AND A TREATMENT DEVICE

CROSS-REFERENCE TO RELATED APPLICATIONS

This application is a continuation application of U.S. application Ser. No. 15/479,730 filed 5 Apr. 2017 which claims a priority date of 6 Apr. 2016 based on prior filed German patent application No. 10 2016 003 942.6, the entire contents of the aforesaid US application and the aforesaid German patent application being incorporated herein by reference to the fullest extent permitted by the law.

BACKGROUND OF THE INVENTION

The invention concerns an exchangeable filter for or of a treatment device, in particular of a filter device for treatment, in particular filtration, of in particular liquid fluids, in particular fuel, oil or water, in particular of an internal combustion engine, in particular of a motor vehicle. The exchangeable filter comprises a housing with a housing pot, a housing cover, at least one inlet for the fluid to be treated, and at least one outlet for the treated fluid, wherein the exchangeable filter by means of a detachable bayonet-type connecting device by performing a rotary/plug-in movement about a connecting axis of the treatment device can be connected to a connecting head of the treatment device. The connecting device comprises at least one housing connecting part associated with the housing that, for connecting the connecting device, can interact with at least one head connecting part associated with the connecting head, wherein the at least one inlet can be connected with at least one supply conduit of the connecting head for the fluid to be treated and/or the at least one outlet can be connected with at least one discharge conduit of the connecting head for the treated fluid. The at least one housing connecting part has a function surface, respectively, on axially opposite sides relative to the connecting axis.

Moreover, the invention concerns a treatment device, in particular a filter device for treatment, in particular filtration, of in particular liquid fluids, in particular fuel, oil or water, in particular of an internal combustion engine, in particular of a motor vehicle. The treatment device comprises at least one exchangeable filter which comprises a housing with a housing pot, a housing cover, at least one inlet for the fluid to be treated, and at least one outlet for the treated fluid. The treatment device further comprises a connecting head that comprises at least one supply conduit for the fluid to be treated that is connectable with the at least one inlet and/or at least one discharge conduit for the treated fluid that is connectable to the at least one outlet. The connecting head and the exchangeable filter can be connected to each other by means of a detachable bayonet-type connecting device by performing a rotary/plug-in movement about a connecting axis of the treatment device. The connecting device comprises at least one housing connecting part associated with the housing and at least one head connecting part associated with the connecting head that can interact with each other for connecting the connecting device.

DE 10 2013 021 299 A1 discloses a treatment device, in particular filter device for treatment, in particular filtration, of in particular liquid fluids, in particular fuel, oil or water, in particular of an internal combustion engine, in particular of a motor vehicle. The treatment device comprises a treatment element which comprises a housing with a housing pot, a housing cover, at least one inlet for the fluid to be treated, and at least one outlet for the treated fluid. A connecting head comprises at least one supply conduit for the fluid to be treated which is connectable with the at least one inlet and/or at least one discharge conduit for the treated fluid which is connectable with the at least one outlet. The connecting head and the treatment element can be connected to each other by means of a detachable bayonet-type connecting device by performing a rotary/plug-in movement about a connecting axis of the treatment device. The connecting device comprises at least one housing connecting part associated with the housing and at least one head connecting part associated with the connecting head which, for connecting the connecting device, can interact with each other. At least a first one of the connecting parts comprises a functional surface, respectively, on axially opposite sides relative to the connecting axis. At least a second one of the connecting parts comprises at least one counter function surface which, for interaction, engages behind one of the function surfaces of the at least one first connecting part. On the at least one second connecting part at least one guide element is arranged which, with the at least one counter function surface, delimits at least one insertion gap whose axial extension relative to the connecting axis is at least as large as the maximum axial spacing of the two axially oppositely positioned function surfaces of the at least one first connecting part. The at least one first connecting part can be guided in the insertion gap upon closing/opening of the connecting device. One of the function surfaces of the at least one first connecting part is guided along the counter function surface and the other of the function surfaces is guided along the at least one guide element.

SUMMARY OF THE INVENTION

The invention has the object to provide an exchangeable filter and a treatment device of the aforementioned kind in which the at least one housing connecting part can be arranged in a more space-saving and/or better protected way on the exchangeable filter.

This object is solved according to the invention in that a rim of the housing pot, on the side of the housing cover, externally projects at least past the at least one housing connecting part in axial direction relative to the connecting axis. In this context, rim of the housing pot refers to the radial outer rim of the housing pot on the side of the connecting area, i.e., on the side of the housing cover. In this area, the inlet and outlet openings and the connecting device for detachable connection on a connecting head are generally arranged.

According to the invention, an uppermost rim of the housing pot is arranged above a top edge of the at least one housing connecting part. In this way, the at least one housing connecting part can be arranged in a protected and space-saving way within the rim of the housing pot. In this way, the exchangeable filter can be more easily packaged, transported, and/or stored. The exchangeable filter can be transported more easily on assembly lines. In this context, the exchangeable filter can be standing on its rim. Since the rim is projecting in axial direction, it can be prevented that the exchangeable filter with the at least one housing connecting part gets caught somewhere. Moreover, the exchangeable filter can be more easily packaged in particular in a cardboard box. Due to the projecting rim, it can be prevented that possibly present sharp-edged areas of the at least one housing connecting part damage the packaging, in particular the cardboard box. As a whole, the exchangeable filter can be better protected during storage and transport to a site of use. The projecting rim of the housing pot prevents that the at least one housing connecting part can become damaged. Moreover, as needed, at least one pretensioning element of the connecting device for realizing a mechanical pretension of the exchangeable filter on the connecting head can be designed smaller at the connecting head in axial direction relative to the connecting axis. In this way, pretensioning characteristics can be improved. In particular, a corresponding spring can have a flatter geometry. In this way, improved spring characteristics can be achieved.

In an advantageous embodiment, the exchangeable filter can be provided at the housing cover with at least one sealing device which can interact seal-tightly relative to the environment with a corresponding component, in particular a sealing surface, provided at the connecting head. Advantageously, the at least one sealing device can comprise at least one sealing receptacle for a seal. Advantageously, the at least one sealing receptacle can comprise at least one holding section, in particular with a sealing groove, with which at least one seal can be held.

Advantageously, with the at least one sealing device at least one fluid-conducting area of the treatment device can be sealed relative to the environment. Advantageously, the at least one sealing device can project past the connecting device in axial direction by maximally 5 mm in upward or downward direction.

Advantageously, the at least one sealing device can project past an axially uppermost point of the at least one housing connecting part upwardly by up to 5 mm in axial direction. In addition or alternatively, the at least one sealing device can project past an axially lowermost point of the at least one housing connecting part downwardly by up to 5 mm in axial direction. This is advantageous in regard to the utilization of installation space because the at least one sealing device utilizes the axial extension of the connecting device.

Advantageously, at least one sealing device, in particular an annular seal or an annular seal unit, can be located as close as possible relative to the connecting axis, i.e., can have a diameter as small as possible. In this way, a force which can be exerted by the at least one sealing device in axial direction on the connecting device can be reduced. The connecting parts of the connecting device can thus be mechanically relieved. Since the at least one sealing device has a diameter as small as possible, the required torque for opening or closing the connecting device can be reduced. The required opening or closing forces can thus be reduced correspondingly. This can have an advantageous effect in regard to ease of service and/or load resilience of the exchangeable filter.

Advantageously, the at least one sealing device can comprise at least one annular seal, in particular an O-ring or a shaped seal. The at least one sealing device can advantageously act to seal radially relative to the connecting axis, in particular in outward or inward direction. In addition or alternatively, the at least one sealing device can act to seal in axial direction.

In a further advantageous embodiment, the rim of the housing pot, on the side of the housing cover, can externally project relative to the connecting axis in axial direction past the at least one sealing device. In this way, the at least one sealing device can also be arranged in a protected and space-saving way within the rim of the housing pot.

Advantageously, the rim of the housing pot can be arranged above a top edge of a holder that forms a groove for an exterior seal.

In a further advantageous embodiment, at least a part of the at least one sealing device can be connected with the housing cover, in particular as one piece. This can have an advantageous effect on the load resilience of the exchangeable filter.

A sealing groove of a sealing receptacle of the at least one sealing device can be covered alternatively with a separate cover ring on its side which is axially facing away from the filter bellows. The cover ring can be connected in this context by means of clamping tabs with an outer sealing socket.

Advantageously, at least a part of the sealing receptacle, in particular a sealing groove, can be formed integrally on or in the housing cover.

Advantageously, at least a part of at least one sealing device can be arranged on the exchangeable filter, in particular on the housing cover and/or, as needed, on the end disk of the filter element. In this way, the at least one sealing device can be exchanged together with the exchangeable filter.

In a further advantageous embodiment, at least one sealing device can be arranged relative to the connecting axis radially inside the at least one housing connecting part. In this way, the at least one housing connecting part can be arranged correspondingly far outwardly relative to the connecting axis. In this way, a better force introduction relative to the connecting forces can be achieved.

Preferably, the at least one sealing device can surround the at least one inlet and the at least one outlet in circumferential direction relative to the connecting axis. In this way, with only one seal a plurality of, in particular all, fluid-conducting spaces can be sealed outwardly, in particular relative to the environment and/or to the connecting parts of the connecting device.

In a further advantageous embodiment, the at least one sealing device may comprise at least one seal. In this way, the at least one seal can be mounted and exchanged together with the exchangeable filter.

Advantageously, the at least one seal can be arranged captively in the at least one sealing receptacle of the at least one sealing device. In this way, the at least one seal cannot be lost during transport or when handling the exchangeable filter.

In a further advantageous embodiment, at least one function surface can have an approximately screw-shaped course about the connecting axis. In this way, a combined rotary/plug-in movement can be simply achieved. By rotation of the exchangeable filter about the connecting axis, the filter is pressed at the same time in axial direction against the connecting head.

In a further advantageous embodiment, at least one housing connecting part can comprise or partially form at least a part of a screw-shaped bayonet-type connecting device. In this way, the advantages of a bayonet-type connection and of a screw connection can be combined. A bayonet-type connection has the advantage that it can be connected and detached simply and quickly with a few turns. A screw connection has the advantage that, when closing the connection, correspondingly great connecting forces that are axial relative to the connecting axis can be realized.

In a further advantageous embodiment with a screw-type or bayonet-type connecting device, a head-associated pretensioning element can be provided which can be supported preferably on the rim of the housing pot in axial direction.

In this way, the operationally safe clamping of the connecting device can be enhanced. The rim is for this purpose preferably embodied as a crimped rim. This makes it possible to absorb the clamping forces. For a particularly tilting-resistant connection, it is advantageous in this context when the rim projects respectively past the housing connecting part (in particular its function surface(s)) as well as the at least one sealing device for sealing relative to the environment, which can interact with a corresponding component, in particular a sealing surface, on the side of the connecting head so as to seal relative to the environment. In this context, the rim projects respectively maximally by 15 mm, preferably maximally by 10 mm, particularly preferred maximally by 5 mm. It is particularly advantageous when the rim projects past the housing connecting part and/or the at least one sealing device maximally by 10 mm, particularly preferred maximally by 5 mm. In this context, it is important that the rim or another part of the housing pot or housing cover that absorbs the clamping forces of a pretensioning element, the housing connecting part (in particular its function surface(s) effective for the connection), and the at least one sealing device are substantially arranged within a plane perpendicular to the center axis. This means in general for such housings, in particular of exchangeable filters, in particular a range of maximally 15 mm, preferably maximally 10 mm, particularly preferred maximally 5 mm, along the center axis and/or preferably a range of maximally 10%, particularly preferred of maximally 5%, of the axial extension of the housing.

In a further advantageous embodiment, the at least one housing connecting part can be pre-manufactured or is pre-manufacturable as a separate part. In this way, the at least one housing connecting part can be realized even in complex shapes. The at least one housing connecting part can be subsequently connected with the other components of the housing, in particular a housing cover and/or a housing pot.

The at least one housing connecting part of the exchangeable filter can comprise a function surface, respectively, on axially opposite sides relative to the connecting axis. At least a corresponding head connecting part of the connecting device associated with the connecting head can comprises at least one counter function surface.

The at least one counter function surface can engage from behind at least one of the function surfaces of the at least one housing connecting part for interaction. In this way, between the at least one counter function surface and the corresponding function surface, a pulling force connection acting axially to the connecting axis can be realized.

In a further advantageous embodiment, the at least one sealing device, which can interact with the corresponding component, in particular a sealing surface, on the side of the connecting head for sealing tightly relative to the environment, is arranged within the axial area which is defined by the housing connecting part, in particular by its axial extension, preferably the axial extension of its area effective for the connection, in particular defined by the axial extension of the function surface. In this way, loads on the seal that may be the result of tilting during operation can be minimized.

The at least one counter function surface can extend advantageously circumferentially relative to the connecting axis for realizing the bayonet-type connection.

Advantageously, the circumferential extension of the areas of the bayonet-type connecting device, across which in the closed state of the connecting device the at least one counter function surface is interacting with the corresponding at least one function surface, can amount to at least 50%, preferably more than 60%, of the circumference of the exchangeable filter. In this way, a corresponding large area can be realized that can act in a force transmitting way. Moreover, the forces between the exchangeable filter and the connecting head can act more uniformly and better in circumferential direction. Also, as a whole, greater forces can be transmitted. The stability of the connection with the connecting device can thus be improved. The mechanical loading of the connecting device can thus be reduced. This can have a positive effect on the service lives.

Advantageously, the at least one function surface can comprise at least one locking element, in particular a locking projection or a locking section, of at least one locking device. Advantageously, the at least one counter function surface and the at least one function surface interacting therewith each can have at least one locking element, in particular a locking projection or a locking section, of at least one locking device which, in the closed position of the at least one connecting device, can lock behind each other, with each other, or inside each other. With the locking device a risk can be reduced that the connecting device can become detached by an accidental turning of the exchangeable filter about the connecting axis. For closing and detaching the at least one locking device, the corresponding locking elements can be separated from each other or moved past each other by appropriate rotation of the exchangeable filter. For this purpose, it can be required to overcome corresponding locking forces. With such an increased force expenditure upon installation, it is also easily detectable when the exchangeable filter is in its correct position.

Advantageously, the connecting device can comprise at least one pretensioning element for realizing a mechanical pretension with which the at least one counter function surface can be pressed against the at least one function surface. In this way, the connecting device can be held under mechanical tension. Operation-caused vibrations can thus be damped. Also, operation-caused noise can be reduced. In particular, possibly occurring rattling can be prevented. Moreover, a possibly existing locking force, which must be overcome for closing or opening the locking action, can be generated or increased.

The at least one pretensioning element can be advantageously arranged at the connecting head. In this way, it can be designed as a lifetime component. It must not be exchanged together with the exchangeable filter. Alternatively or additionally, at least one pretensioning element can be arranged on the housing. It can thus be exchanged together with the exchangeable filter.

The at least one pretensioning element can advantageously be elastic. The at least one pretensioning element can be elastic as a result of its shape and/or its material composition. Advantageously, the at least one pretensioning element can comprise or be made of plastic material, in particular elastomer, and/or in particular elastic metal. Advantageously, the at least one pretensioning element can be a spring element or comprise one.

The at least one pretensioning element can additionally perform a sealing function. The at least one pretensioning element can be combined with a seal or seal unit, or the other way around. Additionally or alternatively, the at least one pretensioning element can be realized with a non-return membrane of the exchangeable filter, or the other way around. With the non-return membrane, a passage of the housing for fluid, preferably the at least one inlet, can be advantageously closable in a flow direction. In this way, a return flow of the fluid can be prevented.

As needed, a seal can be arranged between a raw side and a clean side of the exchangeable filter, in particular of a filter element.

The at least one housing connecting part and/or at least one head connecting part each can be realized with a minimal material thickness in comparison to their radial and circumferential extension relative to the connecting axis. The material thicknesses of the at least one first connecting part and the at least one second connecting part can be of similar magnitude.

Advantageously, the material thickness of the at least one housing connecting part and/or of the at least one head connecting part can be advantageously maximally 3 mm, preferably between 1 mm and 2 mm.

Advantageously, the axial extension of at least one insertion gap can be maximally 3 mm, preferably between 1 mm and 2 mm.

The connecting parts can be formed correspondingly of semifinished products or shaped parts, in particular bent, crimped, folded, cut or stamped or the like. In this way, the corresponding locking sections and (counter) guiding sections can be realized, as needed.

Advantageously, radially within the first connecting parts that are formed as semifinished parts or shaped parts, in particular bent, crimped, folded, cut or stamped or the like, at least one part of the semifinished product or of the shaped parts can be provided. Advantageously, the part of the semifinished part of shaped part that is arranged radially within the at least one housing connecting part is closed in circumferential direction. In this way, the stability of the connecting device and thus the stiffness and permanent loadability of the connection between the connecting devices can be improved.

The connecting device can advantageously be arranged radially within at least one circumferential wall of the housing and/or of the connecting head. In this way, the bayonet-type connecting device can be protected relative to the environment. The connecting device can be arranged advantageously in a corresponding connecting space between the housing and the connecting head.

Advantageously, the at least one counter function surface can rests against the appropriate function surface by an extension as large as possible, preferably across its entire extension, in circumferential direction and in radial direction relative to the connecting axis. In this way, a force transmission between the connecting parts can be improved. Appropriate guiding contours of the at least one counter function surface can glide along the corresponding guiding contours of the corresponding function surface upon opening and closing of the connecting device. In this way, a possibly provided pretensioning element and/or a seal can be axially compressed upon closure of the connecting device. In the case of a seal, the sealing function can be additionally improved in this way.

Advantageously, the at least one counter function surface and the corresponding function surface interacting therewith can be complementary. In this way, in the closing position of the connecting device, they can be resting flat against each other. In this way, force transmission can be improved. Loading of the involved components can thus be further reduced. The components can be dimensioned smaller for transmission of same forces. Due to the matching course of the connecting parts, the axial extensions of the connecting parts can be reduced correspondingly. Advantageously, the connecting parts can be mutually engaging shaped parts. The contours of the at least one counter function surface and of the corresponding function surface can glide across each other upon opening or closing of the connecting device.

Advantageously, the at least one counter function surface and/or at least the function surface interacting therewith each can have an approximately screw-shape course about the connecting axis. In this way, the housing connecting part, upon rotation of the exchangeable filter in rotational direction of closing, can be pulled by means of the connecting parts at the same time in axial direction toward the connecting head. In this way, a combined rotary/plug-in movement can be realized. The pitches of the at least one counter function surface and of the at least one function surface can be advantageously identical.

Advantageously, the pitches can correspond to the pitch of a conventional right-hand thread. In this way, the connecting device, as is in particular conventional for fuel filters or oil filters, can be closed by a right-hand turn rotation of the exchangeable filter and opened in opposite direction.

Advantageously, a height axial to the connecting axis traveled upon closing of the bayonet-type connecting device can correspond to an axial spacing of a possible seal associated with one of the connecting parts relative to a corresponding sealing surface associated with the other connecting part. In this way, by the rotary/plug-in connection, when closing the connecting device, the corresponding seal can be positioned at the corresponding sealing surface.

Advantageously, the exchangeable filter, in particular a housing cover and/or an end disk of a possibly provided filter element, and the connecting head each can comprise at least one correspondence element, in particular a socket, preferably a connecting socket and/or a socket connector and/or sealing socket and/or cylinder socket, which may correspond with each other in pairs when the exchangeable filter is mounted. Advantageously, correspondence elements, in particular the sockets, can engage each other in pairs. In this way, the correspondence elements can be fixed relative to each other radially relative to the connecting axis. Alternatively, the correspondence elements can be arranged in pairs so as to abut, in particular with intermediate positioning of a sealing device. In this way, radial position tolerances relative to the connecting axis can be compensated simply.

Advantageously, at least one pair of correspondence elements can delimit a fluid-conducting space in radial direction externally and/or in radial direction internally.

Advantageously, at least one pair of correspondence elements can be arranged within at least another pair of correspondence elements. In this way, on the inner pair of correspondence elements a first fluid-conducting area, in particular an outlet channel for the fluid, can be realized.

Between the inner pair of correspondence elements and the outer pair of correspondence elements, a second fluid-conducting area, in particular an inlet ring space for the fluid, can be realized advantageously.

The correspondence elements, in particular the pairs of correspondence elements, each can be coaxial to the connecting axis. In this way, they can be positioned relative to each other more simply. Moreover, in this way the fluid-conducting areas can be more uniform in circumferential direction.

At least one pair of correspondence elements, in particular a radial outer pair of correspondence elements, can advantageously surround circumferentially a plurality of fluid-conducting areas, in particular at least one inlet area and at least one outlet area for the fluid. In this way, the corresponding fluid-conducting areas can be separated simply with only one pair of correspondence elements relative to the environment. In this context, contact areas between the correspondence elements of a pair can be sealed, as needed, with one single sealing device.

Advantageously, the connecting parts of the connecting device can be arranged radially outside of the pair of correspondence elements which can surround circumferentially all fluid-conducting areas. In this way, the fluid-conducting areas can be separated with only one pair of correspondence elements, as needed, with only one sealing device, from the connecting parts of the connecting device, preferably also relative to the environment. The connecting parts of the connecting device can thus be protected from fluid in a simple way.

Advantageously, at least one sealing device, in particular an annular seal, preferably an O-ring seal or a combined sealing non-return membrane, can be arranged between the correspondence elements of at least one pair. In this way, the fluid-conducting area delimited by the at least one pair of correspondence elements can be better sealed in the contact area of the connecting sockets.

Advantageously, a material thickness of the at least one housing connecting part and/or of the at least one head connecting part can be constant, respectively, in circumferential direction, at least in the area of the at least one function surface/counter function surface. Accordingly, in particular the axial space requirement of the connecting device can be reduced.

Advantageously, the at least one housing connecting part and/or the at least one head connecting part can be made of sheet metal or can comprise sheet metal. Sheet metal can in general be present in its initial state as rolled metal in the form of planar, flat sheets or strips. Sheet metal can be realized in a simple way with a uniform material thickness. From sheet metal, a mechanically stable connecting part can be realized, even with a relatively minimal material thickness. In this way, the required installation space, in particular in axial direction, of the connecting device can be reduced. Sheet metal can be processed and machined in a simple way, in particular bent, folded, stamped, cut or welded. With sheet metal, simple connections between components, in particular crimped connections or weld connections, can be realized. Advantageously, at least one of the connecting parts can be designed as a formed sheet metal part.

Advantageously, at least one of the connecting parts can be fixedly or detachably connected with the exchangeable filter. At least one of the connecting parts can be fixedly or detachably connected with the connecting head. The at least one connecting part can be connected with the exchangeable filter or the connecting head by means of a material fusing and/or frictional and/or form-fit connection, in particular by means of a crimping connection, a weld connection, a clamping connection, a locking connection, a plug-in connection, a screwed connection and/or an adhesive connection.

Advantageously, the at least one housing connecting part can be connected with the housing cover and/or the housing pot in particular by means of a crimped connection and/or weld connection. In this way, the at least one housing connecting part can be connected stably with the exchangeable filter. In this way, it can be simply exchanged together with the latter.

Advantageously, the at least one housing connecting part can be held on the housing by means of a crimped connection embodied between the housing cover and the housing pot. Alternatively or additionally, advantageously the connecting part can be fastened by means of a material fusing connection on the housing cover and/or on the housing pot.

Advantageously, the housing cover can be connected seal-tightly by use of a sealing material, in particular sealing mass, with the housing pot, in particular by means of a crimped connection.

Advantageously, the housing pot can comprise sheet metal or be made of sheet metal.

Advantageously, a material thickness of the housing cover can amount to between approximately 0.4 mm and 1 mm.

Advantageously, at least one head connecting part can preferably be screwed or welded on the connecting head. By use of a screwed connection the head-associated connecting part can be detached simply from the connecting head, as needed.

Advantageously, the housing cover can be in particular elastically deformable. It can thus be pressed against the connecting head by an overpressure that is present in the housing in particular in operation of the treatment device. The connecting head can thus support the housing cover. In this way, the requirements in regard to pressure stability of the housing cover can be reduced. The housing cover can thus be realized more simply, in particular of simpler materials.

Advantageously, a plurality of function surfaces of the at least one housing connecting part and corresponding counter function surfaces of the at least one head connecting part can be arranged in circumferential direction relative to the connecting axis, in particular in uniform distribution. Accordingly, a force transmission that is particularly uniform in circumferential direction can be improved. Moreover, in this way a rotation angle, required for closing and opening the connecting device, can be reduced. The circumferential extension of each individual function surface/counter function surface can thus be smaller in comparison to utilization of only a single pair of a counter function surface and a corresponding function surface. In order to achieve a comparable uniform force transmission, a single pair of a counter function surface/function surface would have to extend at least once about the entire circumference.

Advantageously, the treatment device can be a filter device for filtration of liquid fluids, in particular fuel, oil or water. The filter device can be used advantageously in an internal combustion engine.

Advantageously, the exchangeable filter can be an exchangeable oil filter or exchangeable fuel filter. The housing of the exchangeable filter can then be a filter housing. The exchangeable filter can be designed as a so-called spin-on filter. Advantageously, in the filter housing at least one filter element can be arranged in such a way that it separates the at least one inlet from the at least one outlet. The connecting head can advantageously be a filter head on which the exchangeable filter, in particular the filter housing, can be detachably mounted by means of the connecting device.

An exchangeable filter is usually a filter in which the at least one filter element is exchanged together with the filter housing. In general, the at least one filter element is arranged fixedly in the filter housing. Correspondingly, the connections between housing pot and housing cover must not be detachable in a non-destructible way.

The invention is not limited to a treatment device of an internal combustion engine of a motor vehicle. Instead, it can also be employed in other types of internal combustion engines, in particular industrial motors. The invention can also be employed in different types of treatment devices for fluid in the field of or outside the field of automotive technology. The invention can also be used for air/oil separator boxes, drying agent boxes or water filters.

The object is moreover solved for the treatment device in that a rim of the housing pot, on the side of the housing cover, externally projects in axial direction relative to the connecting axis at least past the at least one housing connecting part.

The advantages and features which have been disclosed in connection with the exchangeable filter according to the invention and its advantageous embodiments apply likewise to the treatment device according to the invention and its advantageous embodiments, and vice versa.

BRIEF DESCRIPTION OF THE DRAWINGS

Further advantages, features, and details of the invention result from the following description in which an embodiment of the invention will be explained in more detail with the aid of the drawing. A person of skill in the art will expediently consider the features disclosed in combination in the drawing, the description, and the claims also individually and combine them to meaningful further combinations.

FIG. 3 shows a detail view of the longitudinal section of the filter device of FIG. 1 in the area of the connecting device.

FIG. 4 shows a detail view of the longitudinal section of the exchangeable filter of FIG. 2 in the area of the connecting device.

FIG. 5 is an isometric illustration of the filter device of FIG. 1.

In the Figures, same components are provided with same reference characters.

DESCRIPTION OF PREFERRED EMBODIMENTS

Figure 1:
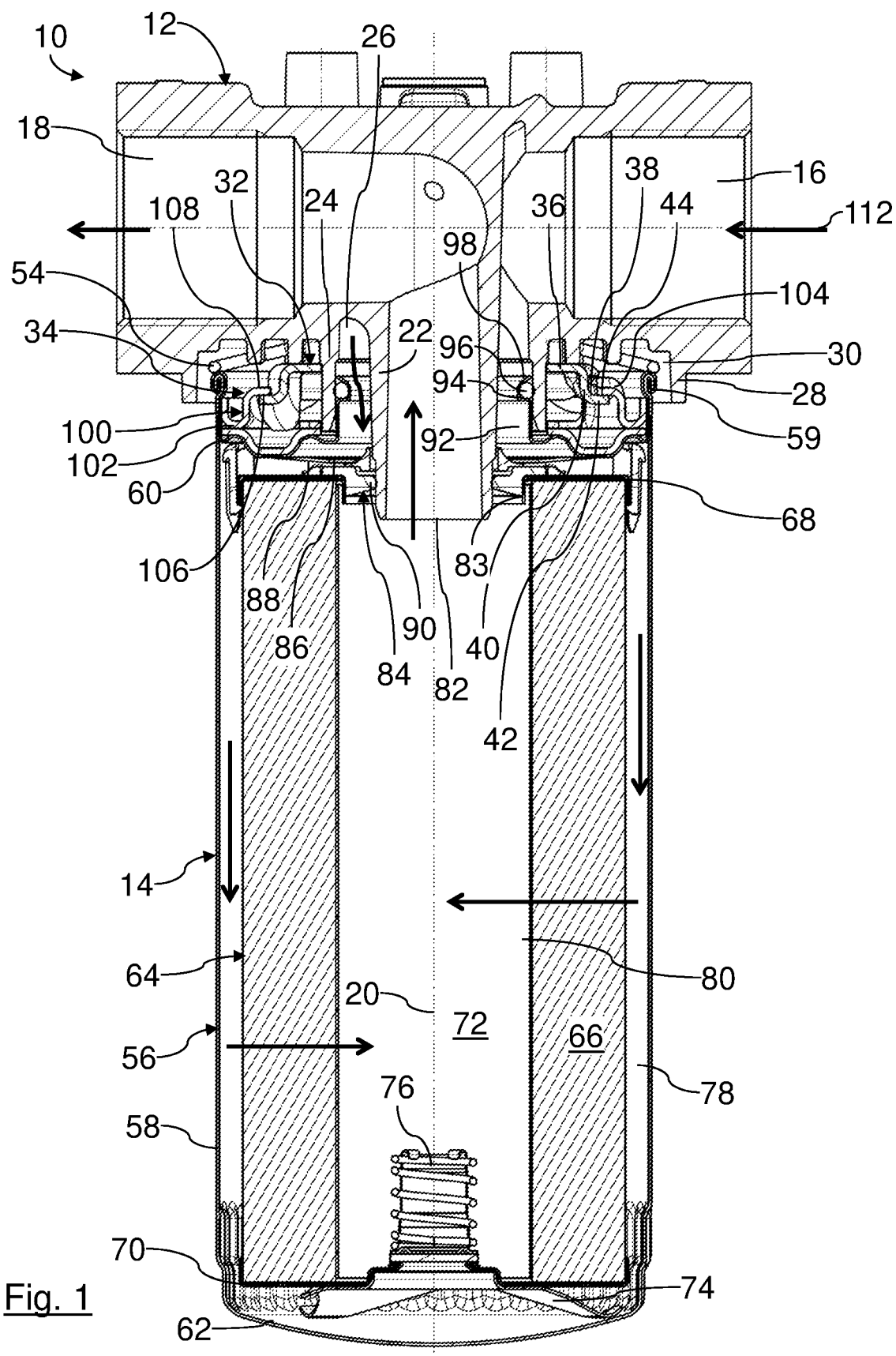
FIG. 1 shows a longitudinal section of a filter device for motor oil of an internal combustion engine of a motor vehicle, comprising a filter head and an exchangeable filter which is connected by means of a detachable bayonet-type connecting device with the filter head.
Figure 2:
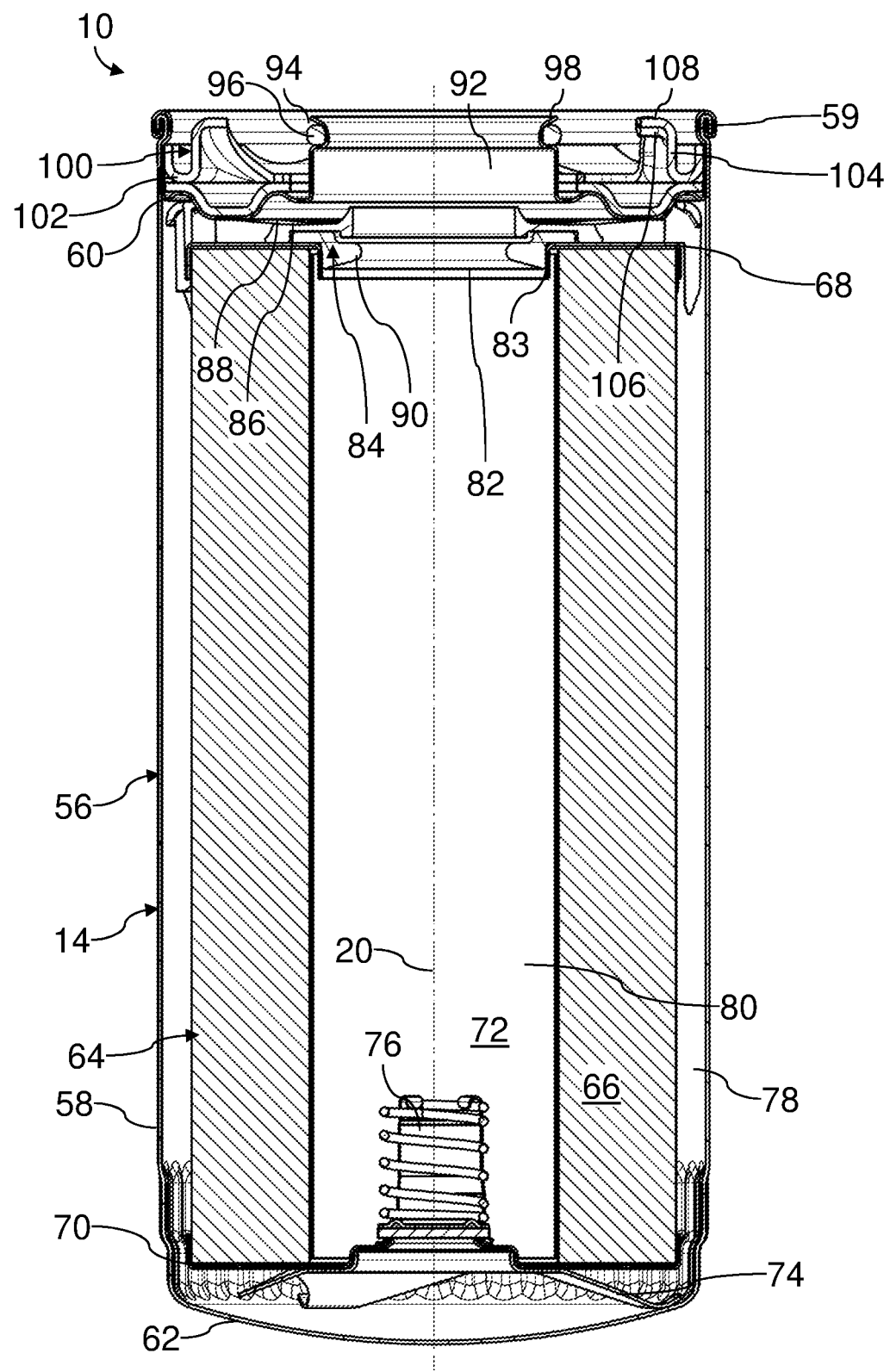
FIG. 2 shows a longitudinal section of the exchangeable filter of FIG. 1.

In FIGS. 1 to 7, a filter device 10 for motor oil of a motor oil circuit of an internal combustion engine of a motor vehicle and its components are illustrated in different perspective views, section views, and detailed views. The filter device 10 serves for cleaning the motor oil.

The filter device 10 comprises a filter head 12 on which an exchangeable filter 14 is detachably fastened. The filter head 12 is connected fixedly with the internal combustion engine and serves as a connecting part for the exchangeable filter 14. The filter head 12 is illustrated in detail in FIG. 7. The filter head 12 comprises a supply conduit 16 and a discharge conduit 18 for the motor oil. The supply conduit 16 and the discharge conduit 18 are connected in a way not of interest in this context with appropriate oil conduits of the internal combustion engine.

The filter head 12 comprises moreover a radial inner connecting socket 22 which is coaxial relative to connecting axis 20.

When in the following "axial", "radial", "coaxial", "circumferential" or the like is mentioned, this relates, if not indicated differently, to the connecting axis 20. In the illustrated embodiment, the connecting axis 20 coincides with a filter axis of the exchangeable filter 14.

The inner connecting socket 22 is approximately circular cylindrical. It extends on the side of the filter head 12 which is facing the exchangeable filter 14. It is open at both ends. On its side facing away from the exchangeable filter 14, the inner connecting socket 22 is fluidically connected to the discharge conduit 18.

The inner connecting socket 22 is coaxially surrounded by a circular cylindrical, radial outer connecting socket 24. The inner connecting socket 22 projects on the side facing the exchangeable filter 14 past the outer connecting socket 24 in axial direction.

The inner connecting socket 22 and the outer connecting socket 24 each delimit circumferentially a coaxial inlet ring space 26. The inlet ring space 26 is connected by a fluid connection with the supply conduit 16.

The inner connecting socket 22 and the outer connecting socket 24 are surrounded coaxially by a circular cylindrical circumferential wall 28. The free rim of the outer connecting socket 24 projects, viewed in axial direction, past the free rim of the circumferential wall 28 facing the exchangeable filter 14. The circumferential wall 28 forms the radial outer boundary of the filter head 12 on the side facing the exchangeable filter 14. The circumferential wall 28 and the outer connecting socket 24 delimit in circumferential direction, respectively, an annular coaxial connecting space 30. The connecting space 30 is open toward the environment.

In the connecting space 30, a head connecting part 32 of a detachable bayonet-type connecting device 34 is arranged. With the connecting device 34, the exchangeable filter 14 is detachably connected to the filter head 12. The head connecting part 32 that, as a whole, is approximately ring-shaped is formed of sheet metal. The thickness of the sheet metal is constant at approximately 2 to 3 mm.

Radially inwardly, the head connecting part 32 comprises an annular head mounting section 36. The head mounting section 36 abuts with its radial inner circumferential side approximately the radial outer circumferential side of the outer connecting socket 24. The head mounting section 36 extends radially and circumferentially approximately in a plane. The head connecting part 32 extends radially approximately across a third of the connecting space 30.

The head mounting section 36 passes into four head-associated bayonet sections 38. The head-associated bayonet sections 38 are identical in shape and size. The head-associated bayonet sections 38 are uniformly distributed in circumferential direction. The head-associated bayonet sections 38 each comprise a circumferential section 40 which is substantially extending circumferentially parallel to an imaginary circular cylinder wall about the connecting axis 20. The circumferential sections 40 each pass into a function section 42 on their sides which are facing away from the head mounting section 36. The circumferential sections 40 connect thus the head mounting section 36 with the respective function sections 42. The function sections 42 are easily visible in particular in FIGS. 3 and 7. On their back facing away from the exchangeable filter 14, the function sections 42 each have a counter function surface 44. The head-side bayonet sections 38 may have a S-shaped cross section (see FIG. 1 at 38), a first portion of the head-side bayonet sections arranged on the connecting head 12. A second portion of the head-side bayonet sections spaced axially outwardly away from the first portion.

The function sections 42, in particular the counter function surfaces 44, each have an approximately screw-shaped course about the connecting axis 20. The pitch of the counter function surfaces 44 and of the function sections 42 corresponds approximately to the pitch of a usual right-hand thread. Viewed from the exchangeable filter 14 in axial direction, the leading ends of the function sections 42 in clockwise direction are closer to the exchangeable filter 14, respectively, than the trailing ends in clockwise direction. Between the leading ends of the function sections 42 and the plane of the head mounting section 36, there is a gap, respectively, through which the corresponding housing-associated bayonet sections 104 to be explained in more detail in the following can be inserted.

The sheet metal of the head connecting part 32 is of the same thickness in the head mounting section 36, in the circumferential sections 40, and in the functional sections 42. This means also that it has a uniform axial extension in the head mounting section 36 and in the function sections 42.

The function sections 42 each have a head-associated locking projection 46. The locking projections 46 are realized as respective bends in the counter function surfaces 44. The locking projections 46 project axially on the side which is facing the exchangeable filter 14.

Figure 7:
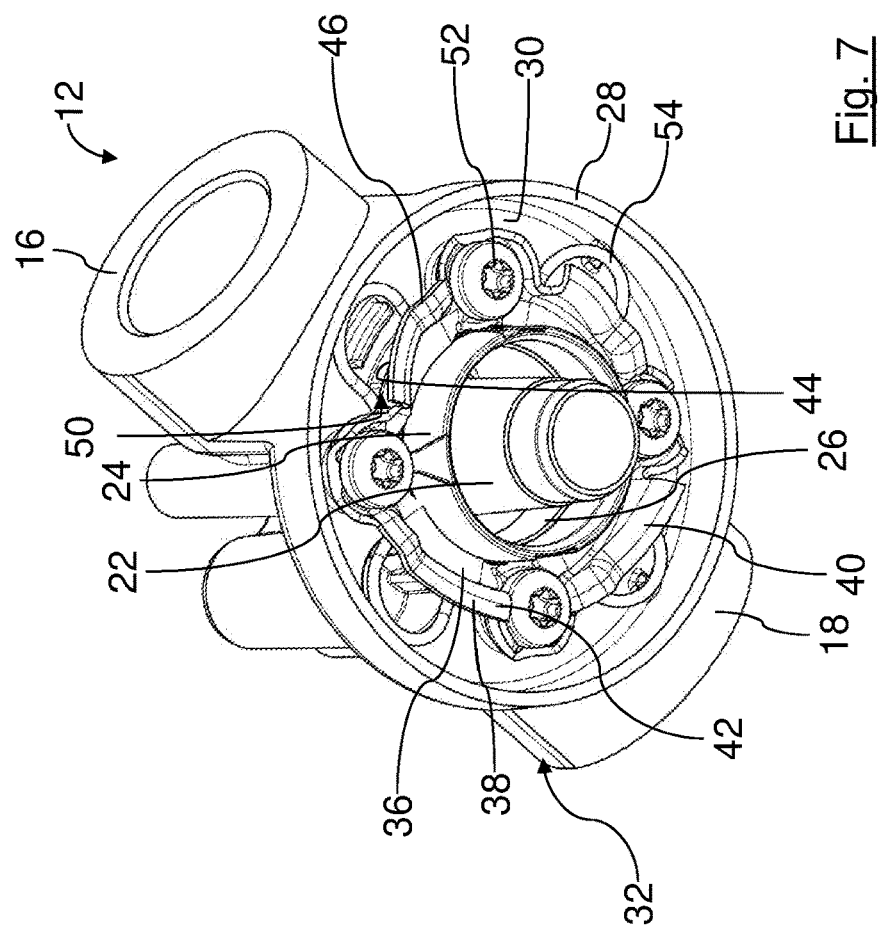
FIG. 7 is an isometric illustration of the filter head of the filter device of FIG. 1.
Figure 6:
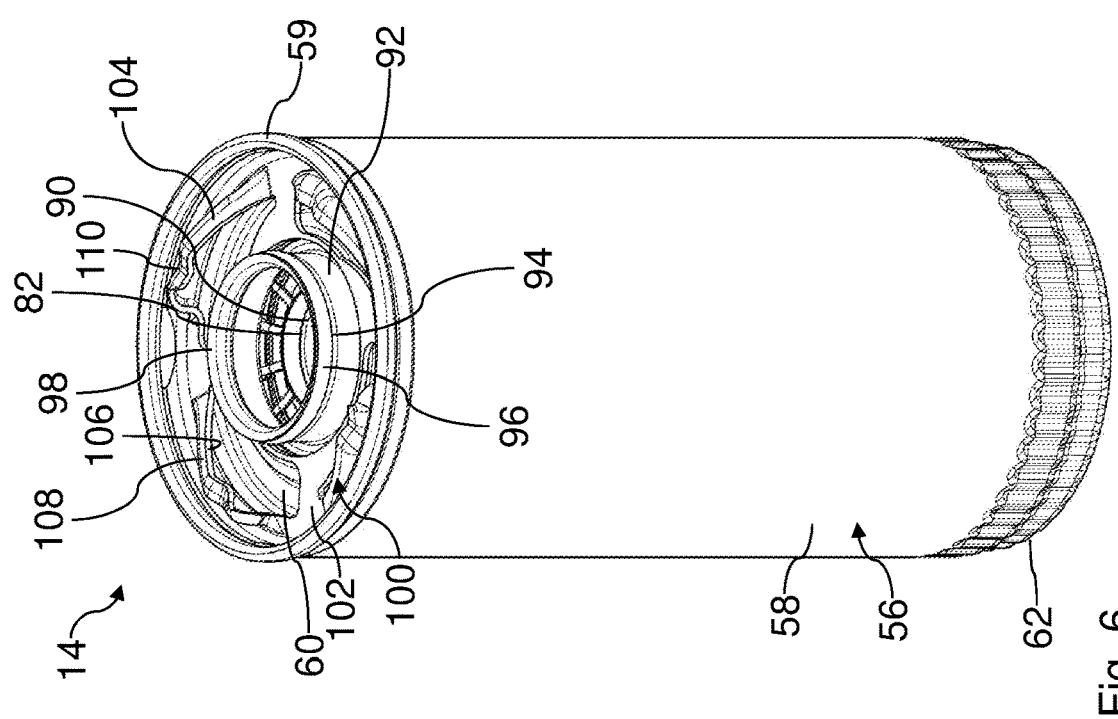
FIG. 6 is an isometric illustration of the exchangeable filter of the filter device of FIG. 1.

The head connecting part 32 is fastened to the filter head 12 at the head mounting section 36 with a total of four screws 52, as shown in FIG. 7, from the side which is facing the exchangeable filter 14. The screws 52 are located respectively between a trailing end in the clockwise direction of a head-associated bayonet section 38 and a leading end in the clockwise direction of the next head-associated bayonet section 38.

Moreover, a pretension spring 54 is arranged in the connecting space 30. The pretension spring 54 is resiliently flexible in axial direction.

The exchangeable filter 14 is designed as a spin-on filter with a round cross section. It is substantially coaxial to the connecting axis 20. The exchangeable filter 14 comprises a filter housing 56 with a housing pot 58, having in its open side a housing cover 60 with its radial outer rim attached by means of a crimped connection. The crimped connection forms a crimped rim 59 of the housing pot 58. A radial outer diameter of the filter housing 56 in the area of the crimped rim 59 is smaller than a radial inner diameter of the circumferential wall 28 of the filter head 12. The housing pot 58 has an outwardly curved housing bottom 62. The housing cover 16 and the housing pot 58 are made of metal.

A coaxial filter element 64 is arranged in the interior of the housing pot 58. The filter element 64 comprises a filter medium which is folded to a filter bellows 66 and is circumferentially closed. At its end faces, the filter bellows 66 is connected seal-tightly with a connecting end disk 68, in FIGS. 1 and 2 at the top, and a counter end disk 70, at the bottom. The connecting end disk 68 is located on the side of the filter element 64 facing the housing cover 60.

The filter bellows 66 surrounds an element interior 72 of the filter element 64. The element interior 72 is located on a clean side of the filter element 64.

The counter end disk 70 closes off the element interior 72 on the end face of the filter element 64 facing the housing bottom 62. On the exterior side of the counter end disk 70 facing the housing bottom 62, a plurality of spring elements 74 are supported which are supported with the other end on the housing bottom 62.

In the counter end disk 70, a spring-loaded bypass valve 76 is arranged which in the open state, under conditions which are not of interest in this context, enables an oil flow of motor oil from the housing bottom 62 directly into the element interior 72 by bypassing the filter medium. The bypass valve 76 is shown in its closed position in FIG. 1.

The filter element 64 is surrounded radially externally by a raw-side annular space 78 which is delimited by the radial inner circumferential side of the housing pot 58.

In the element interior 72, a coaxial central tube 80 is moreover extending between the counter end disk 70 and the connecting end disk 68. A circumferential wall of the central tube 80 is permeable by the motor oil. A radial inner circumferential side, i.e., radial inner fold edges, of the filter bellows 66 can be supported on the radial outer circumferential side of the central tube 80.

The connecting end disk 68 comprises a coaxial outlet 82 for the filtered motor oil. On the radial inner circumferential side, the connecting end disk 68 is formed to a coaxial cylinder socket 83 which is extending axially in the element interior 72.

On the side which axially is facing away from the element interior 72, a two-part annular coaxial inner seal unit 84 is fastened on the end face of the filter element 64. The inner seal unit 84 is comprised of an elastomer.

Radially outwardly, a first part of the inner seal unit 84 comprises a non-return membrane 86. The non-return membrane 86 is annular and surrounds the outlet 82 in radial direction outwardly. The non-return membrane 86 is positioned with mechanical pretension on the inner side of the housing cover 60 facing the filter bellows 66. As shown in FIGS. 1 to 4, it closes off in the pressureless state a coaxial annular inlet 88 of the housing cover 60 for motor oil. As soon as motor oil is supplied to the filter device 10, the non-return membrane 86 opens in flow direction due to the oil pressure. A return flow of the motor oil through the inlet 88 is prevented by the non-return membrane 86.

A second part of the inner seal unit 84 forms radially inwardly a coaxial inner annular seal 90. The inner annular seal 90 can be supported with its radial outer circumferential side on the radial inner circumferential side of the cylinder socket 83. When the exchangeable filter 14 is installed, the inner annular seal 90 is resting with its radial inner circumferential side seal-tightly against a radial outer circumferential side, designed as a sealing surface, of the radial inner connecting socket 22. With the inner annular seal 90 in the area of the inlet 88, the clean side of the exchangeable filter 14 is separated from its raw side.

The housing cover 60 comprises a stepped coaxial outer sealing socket 92. A constriction of the outer sealing socket 92 at its end facing axially away from the filter bellows 66 forms an outer sealing groove 94 for an external annular seal 96. The outer annular seal 96 is designed as an O-ring. The sealing groove 94 is open in radial outward direction.

A radial outer diameter of the outer sealing socket 92 outside of the area of the sealing groove 94 corresponds approximately to the radial inner diameter of the outer connecting socket 24 of the filter head 12. When the exchangeable filter 14 is installed, the sealing socket 92 is positioned in the outer connecting socket 24. The radial outer circumferential side of the outer sealing socket 92 is then resting against the radial inner circumferential side of the radial outer connecting socket 24.

On its side which is axially facing away from the filter bellows 66, the outer sealing groove 94 is covered by a cover section 98. The cover section 98 is monolithically connected with the outer sealing socket 92 or is a part thereof. The crimped rim 59 of the housing pot 58 externally projects past the sealing socket 92 with the cover section 98 in axial direction. The sealing socket 92, the sealing groove 94, and the cover section 98 form a sealing receptacle for the outer annular seal 96. In the sealing groove 94, the ring seal 96 is held captively.

When the exchangeable filter 14 is installed, the outer annular seal 96 is radially seal-tightly resting against the radial inner circumferential side, designed as a sealing surface, of the radial outer connecting socket 24. The outer annular seal 96 separates thus the oil-conducting area of the filter device 10 from the connecting space 30 and from the environment.

An annular coaxial housing connecting part 100 of the connecting device 34 is formed of sheet metal. The housing connecting part 100 is pre-manufactured as a separate component. A thickness of the sheet metal of the housing connecting part 100 corresponds approximately to the thickness of the sheet metal of the head connecting part 32.

The housing connecting part 100 extends radially from the radial outer circumferential side of the housing cover 60 to approximately the radial center of the connecting space 30. The housing connecting part 100 overlaps the head connecting part 32. The crimped rim 59 of the housing pot 58 externally projects in axial direction past the housing connecting part 100. The housing connecting part 100 as a section may have an S-shaped cross section (see FIG. 1 at 100) having a lower portion of the S-shaped cross section arranged on the housing cover 60 and contacting against the radially inner surface of the circumferential outer wall 102; and an upper portion of the spaced axially outwardly away from the lower portion and the housing cover 60. The upper portion projects radially inwardly over the housing cover 60 in a direction towards the outlet 82.

The housing connecting part 100 comprises a housing mounting section 102 which extends circumferentially. The housing mounting section 102 is secured radially outwardly in axial direction between the housing cover 60 and the crimped rim 59 connecting the housing pot 58 with the housing cover 60.

The housing mounting section 102 passes on its radial inner side into four identical housing-associated bayonet sections 104. The housing-associated bayonet sections 104 are circumferentially uniformly distributed. They have approximately the shape and size of the head-associated bayonet sections 38. The highest points of the housing-associated bayonet sections 104 are located, viewed axially, approximately at the same level as the cover section 98 of the outer sealing socket 92. Externally, the crimped rim 59 projects in axial direction past the highest points of the housing-associated bayonet sections 104 and thus of the housing connecting part 100.

The housing-associated bayonet sections 104 comprise on axially opposite sides an inner function surface 106 and an outer function surface 108. The function surfaces 106 and 108 each extend opposite to the counter function surfaces 44 approximately in a screw shape about the connecting axis 20 with the same pitch as the counter function surfaces 44.

The inner function surfaces 106 are located on the side of the respective housing-associated bayonet section 104 facing the housing cover 60. The outer function surfaces 108 are located correspondingly on the axially opposite side. In the closed state of the connecting device 34, the inner function surfaces 106 are each engaged from behind for interaction by one of the counter function surface 44 of one of the head-associated bayonet sections 38. In this context, the inner function surfaces 106 each are resting flat against the corresponding counter function surfaces 44.

The housing-associated bayonet sections 104 each comprise a housing-associated locking projection 110. The locking projections 110 project axially toward the housing cover 60. When the exchangeable filter 14 is installed, the housing associated locking projections 110 lock behind the corresponding head-associated locking projections 46.

For installation, the exchangeable filter 14 is pushed, with the housing cover 60 leading, coaxially against the connecting side of the filter head 12. At the latest when the cover section 98 meets the end face of the radial outer connecting socket 24 of the filter head 12 and/or the housing connecting part 100 meets the head connecting part 32, the exchangeable filter 14 is additionally rotated about the connecting axis 20 in a right-hand rotation direction, which is the closing rotation direction of the connecting device 34, As soon as the free ends of the housing-associated bayonet sections 104 are positioned in the area of the corresponding free ends of the head-associated bayonet sections 38, the guiding action of the respective outer function surfaces 108 from the exterior and of the respective inner function surfaces 106 along the corresponding counter function surfaces 44 begins. The pretension springs 54 are supported on the housing connecting part 100, and/or preferably on the rim, in particular the crimped rim 59 of the housing pot 58, in axial direction. Due to the pulling action in axial direction caused by the screw-shaped pitch of the counter function surface 44 and the inner function surface 106 between the bayonet sections 38 and 104, the inner annular seal 90 is pulled onto the radial inner connecting socket 22 and the outer ring seal 96 is pulled into the radial outer connecting socket 24.

As soon as the housing-associated locking projections 110 abut the corresponding head-associated locking projections 46, a corresponding locking force must be overcome for further rotation. The locking force is partially realized by the restoring force of the pretension spring 54.

After overcoming the locking force, the housing-associated locking projections 110 lock behind the head-associated locking projections 46 and secure thus the connecting device 34 against accidental opening.

For separating the exchangeable filter 14 from the filter head 12, the exchangeable filter 14 is turned in left-hand orientation, i.e., in the opening rotation direction about the connecting axis 20. For this purpose, first the locking force of the housing-associated locking projections 110 with the head-associated locking projections 46 must be overcome.

Under the spring pretension of the pretension spring 54, the inner function surfaces 106 are guided along the corresponding counter function surfaces 44.

As soon as the housing-associated bayonet sections 104 have left the corresponding head-associated insertion gaps 50 after further rotation movement, the exchangeable filter 14 can be pulled with an axial movement away from the filter head 12.

In operation of the filter device 10, i.e., in operation of the internal combustion engine, motor oil to be purified flows through the supply conduit 16, indicated in FIG. 1 by an arrow 112, into the inlet ring space 26. From here, the motor oil flows through the inlet 88, upon release by the non-return membrane 86, into the raw-side annular space 78 of the filter housing 56. The motor oil to be purified flows through the filter bellows 66 in radial direction from the exterior to the interior and passes through circumferential openings of the central tube 80 into the element interior 72. From the element interior 72, the purified motor oil flows through the outlet 82 and the radial inner connecting socket 22 of the filter head 12 to the discharge conduit 18. The purified motor oil exits the filter head 12 and thus the filter device 10 through the discharge conduit 18.

While specific embodiments of the invention have been shown and described in detail to illustrate the inventive principles, it will be understood that the invention may be embodied otherwise without departing from such principles.

What is claimed is:

1. An exchangeable filter of a treatment device, comprising:
    a housing comprising:
        a housing pot having:
            a circumferential outer wall elongated along and closing around a connecting axis having an open first axial end, the circumferential outer wall having an axial outer edge at the open first axial end; and
            a housing bottom closing a second axial end of the housing pot;
        a housing cover arranged at the open first axial end of the housing and spaced axially inwardly away from the axial outer edge;
        at least one inlet for a fluid to be treated configured to connect to a supply conduit of a treatment head; and
        at least one outlet for the treated fluid configured to connect to a discharge conduit of the treatment head;
        a housing connection member arranged on an exterior side of the housing cover,
    wherein the exchangeable filter is configured to be connected to a connecting head of the treatment device with a detachable bayonet-type connecting device by performing a rotary/plug-in movement about the connecting axis;
    the detachable bayonet-type connecting device comprising:
        an annular housing connecting part having
            a plurality of housing connection sections which are arranged circumferentially uniformly distributed one after another on an outer side of the housing cover,
            the annular housing connecting part contacting the housing cover and arranged axially between the housing cover and the axial outer edge of the circumferential outer wall of the housing pot;
        wherein the plurality of housing connection sections each having:
            a lower portion of the housing connection sections arranged on the housing cover and projecting axially outwardly away from the housing cover; and
            an upper portion of the housing connection sections spaced axially outwardly away from the housing cover, the upper portion of the of the housing connection sections projecting radially inwardly from the lower portion and extending over the housing cover;
        wherein the axially outer edge of the circumferential outer wall of the housing pot at the open first axial end projects axially outwardly beyond the plurality of housing connection sections in an axial direction away from the housing bottom.

2. The exchangeable filter according to claim 1, comprising
    at least one sealing device disposed on an axially outer side of the housing cover at the open first axial end of the housing pot,
    wherein the at least one sealing device is configured to interact with a component of the connecting head to seal relative to an environment.

3. The exchangeable filter according to claim 2, wherein the at least one sealing device is configured to interact with a sealing surface of the component of the connecting head.

4. The exchangeable filter according to claim 2, wherein the axially outer edge of the circumferential outer wall of the housing pot forms a rim which radially outwardly surrounds the at least one sealing device and axially projects past the at least one sealing device in the direction away from the housing bottom.

5. The exchangeable filter according to claim 4, wherein the rim of the housing pot axially projects past the at least one sealing device maximally by 15 mm and axially projects past the at least one housing connecting part maximally by 15 mm.

6. The exchangeable filter according to claim 5, wherein the rim projects past the at least one sealing device maximally by 10 mm and axially projects past the plurality of housing connection sections (104) maximally by 10 mm.

7. The exchangeable filter according to claim 6, wherein the rim of the housing pot axially projects past the at least one sealing device maximally by 5 mm and axially projects past the plurality of housing connection sections maximally by 5 mm.

8. The exchangeable filter according to claim 2, wherein at least a part of the at least one sealing device is connected to the housing cover.

9. The exchangeable filter according to claim 8, wherein said part of the at least one sealing device is secured to the housing cover.

10. The exchangeable filter according to claim 2, wherein the at least one sealing device, relative to the connecting axis, is arranged radially inside the plurality of housing connection sections.

11. The exchangeable filter according to claim 2, wherein the at least one sealing device comprises at least one seal ring.

12. The exchangeable filter according to claim 1, wherein at least one of the axially inner functional surface first and second function surfaces has an approximately screw-shaped course about the connecting axis.

13. The exchangeable filter according to claim 1, wherein the annular housing connecting is a pre-manufactured separate part.

14. A treatment device for treating a fluid, the treatment device comprising:
    the exchangeable filter according to claim 1;
    a connecting head configured to engage with and mount the exchangeable filter onto the connecting head, the connecting head comprising:
        at least one supply port for the fluid to be treated, said at least one supply port connected to the at least one inlet of the exchangeable filter when the exchangeable filter engages and mounts to the connecting head;
        at least one discharge port for treated fluid which is fluidically connected to the at least one outlet of the exchangeable filter when the exchangeable filter engages and mounts to the connecting head;
    wherein the connecting head and the exchangeable filter engage and mount together by the releasable bayonet-type connecting device, through the execution of the rotational/plug-in movement about the connecting axis of the exchangeable filter;

wherein the connecting head comprises a second portion of the detachable bayonet-type connecting device including:

an outer cylindrical wall projecting axially outwardly towards the exchangeable filter and radially enclosing an annular connection space on the connecting head;

at least one head connecting part arranged in the annular connection space, the at least one head connecting part having a first portion arranged on the connecting head;

a second portion of the at least one head connecting part spaced axially outwardly away from the first portion of the at least one head connecting part, the second portion projecting radially outwards the outer cylindrical wall and engaging against the upper portion of the housing connection sections of the exchangeable filter;

wherein the housing cover of the exchangeable filter includes a tubular projection which projects axially outward away from the exchangeable filter, the tubular projection surrounding the at least one outlet, and having a sealing groove formed on the tubular projection and further having an outer sealing ring arranged in the sealing groove;

wherein the outer sealing ring is arranged radially within the at least one housing connection part of the treatment element.

15. The treatment device according to claim 14, wherein the connecting head further comprises:

a plurality of pretensioning springs, each arranged adjacent to the at least one head connecting part, the plurality of pretensioning springs arranged in the annular connection space on the connecting head;

the plurality of pretensioning springs having:

a first portion of each of the plurality of pretensioning springs pressing against the connecting face of the filter head; and a second portion of each of the plurality of pretensioning springs pressing against an axially outer end of the rim of the housing pot of the exchangeable filter.

* * * * *